(12) United States Patent
Robic

(10) Patent No.: US 11,066,991 B2
(45) Date of Patent: Jul. 20, 2021

(54) CONSTANT-VOLUME COMBUSTION (CVC) CHAMBER FOR AN AIRCRAFT TURBINE ENGINE INCLUDING AN INTAKE/EXHAUST VALVE HAVING A SPHERICAL PLUG

(71) Applicant: Safran Aircraft Engines, Paris (FR)

(72) Inventor: Bernard Robic, Thomery (FR)

(73) Assignee: Safran Aircraft Engines, Paris (FR)

( * ) Notice: Subject to any disclaimer, the term of this patent is extended or adjusted under 35 U.S.C. 154(b) by 264 days.

(21) Appl. No.: 16/235,992

(22) Filed: Dec. 28, 2018

(65) Prior Publication Data

US 2019/0136760 A1 May 9, 2019

Related U.S. Application Data

(62) Division of application No. 14/417,642, filed as application No. PCT/FR2013/051832 on Jul. 30, 2013, now Pat. No. 10,215,092.

(30) Foreign Application Priority Data

Aug. 3, 2012 (FR) ..................................... 12 57599

(51) Int. Cl.
| | |
|---|---|
| *F02C 5/12* | (2006.01) |
| *F23R 7/00* | (2006.01) |
| *F02C 7/057* | (2006.01) |

(52) U.S. Cl.
CPC .............. *F02C 5/12* (2013.01); *F02C 7/057* (2013.01); *F23R 7/00* (2013.01); *F05D 2220/323* (2013.01); *Y10T 137/8803* (2015.04); *Y10T 137/88022* (2015.04)

(58) Field of Classification Search
CPC ..................................... F02C 5/12; F23R 7/00
See application file for complete search history.

(56) References Cited

U.S. PATENT DOCUMENTS

| | | | |
|---|---|---|---|
| 2,486,967 A | * | 11/1949 | Morrison .................. F02K 7/02 244/15 |
| 2,623,355 A | | 12/1952 | Boulet |
| 4,953,527 A | | 9/1990 | Coates |

(Continued)

FOREIGN PATENT DOCUMENTS

| | | |
|---|---|---|
| EP | 0 369 099 A1 | 5/1990 |
| FR | 2 945 316 A1 | 11/2010 |

(Continued)

OTHER PUBLICATIONS

International Search Report issued in PCT/FR2013/051832 dated Oct. 8, 2013 (w/ English translation).

(Continued)

*Primary Examiner* — Lorne E Meade
(74) *Attorney, Agent, or Firm* — Oblon, McClelland, Maier & Neustadt, L.L.P.

(57) ABSTRACT

A constant-volume combustion chamber for an aircraft turbine engine, including a compressed gas intake valve configured to adopt an open position and a closed position, and in the closed position blocking intake of compressed gas into the chamber, and a combusted gas exhaust valve configured to adopt a closed position, in the closed position blocking exhaust of combusted gas outside the chamber. At least one of the intake and exhaust valves includes at least one spherical plug.

1 Claim, 12 Drawing Sheets

(56) References Cited

U.S. PATENT DOCUMENTS

| | | | |
|---|---|---|---|
| 5,546,744 A | 8/1996 | Winfree | |
| 5,557,926 A | 9/1996 | Hunter, Jr. | |
| 5,615,548 A | 4/1997 | Winfree | |
| 6,062,018 A | 5/2000 | Bussing | |
| 7,328,680 B1 | 2/2008 | Diamond | |
| 7,526,912 B2 | 5/2009 | Tangirala | |
| 8,220,488 B2 | 7/2012 | McCully | |
| 8,403,063 B2 | 3/2013 | Inglis | |
| 8,925,296 B2 | 1/2015 | Aguilar | |
| 8,950,430 B2 | 2/2015 | Kukielka | |
| 9,422,785 B2 | 8/2016 | Kukielka | |
| 10,215,092 B2 * | 2/2019 | Robic | F23R 7/00 |
| 2008/0006019 A1 | 1/2008 | Tangirala et al. | |
| 2012/0017563 A1 | 1/2012 | Aguilar | |

FOREIGN PATENT DOCUMENTS

| | | | |
|---|---|---|---|
| WO | 2010/086091 A1 | 8/2010 | |
| WO | 2011/084072 A1 | 7/2011 | |

OTHER PUBLICATIONS

Preliminary Search Report issued in French Patent Application No. 1257599 dated May 15, 2013 (w/ English translation of categories of cited documents).
U.S. Appl. No. 14/417,642.

\* cited by examiner

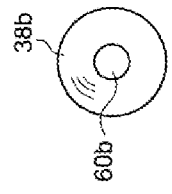
FIG. 9C
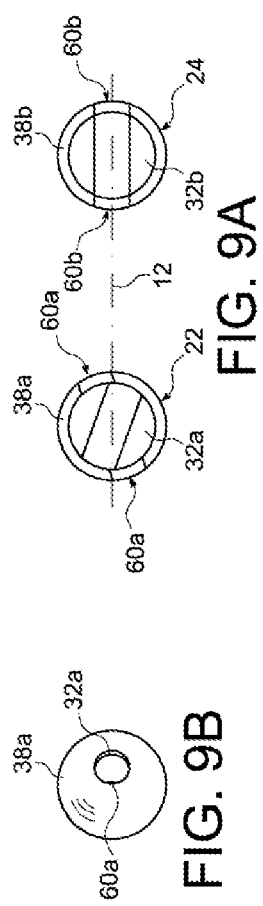
FIG. 9A
FIG. 9B
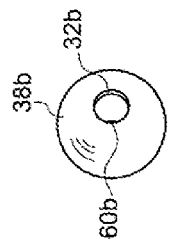
FIG. 10C
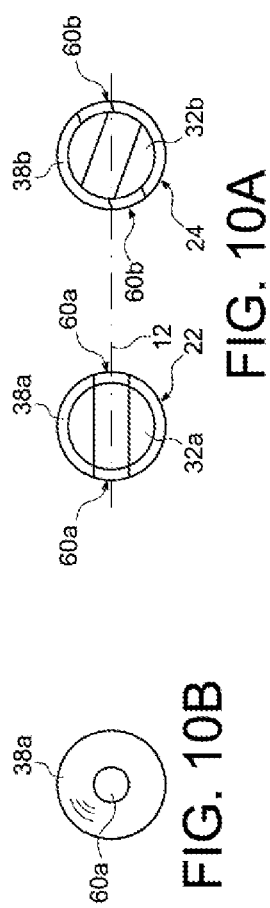
FIG. 10A
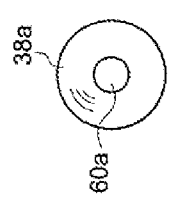
FIG. 10B

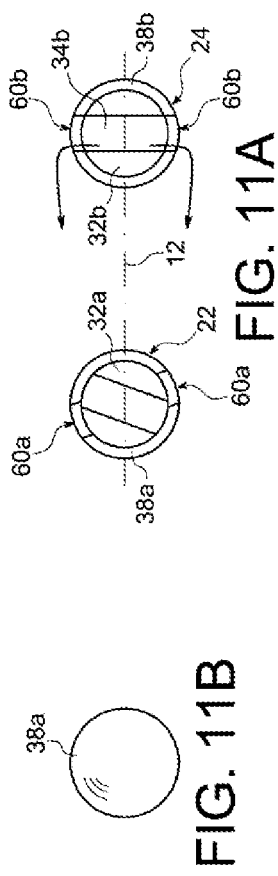
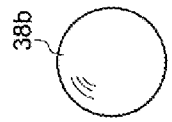
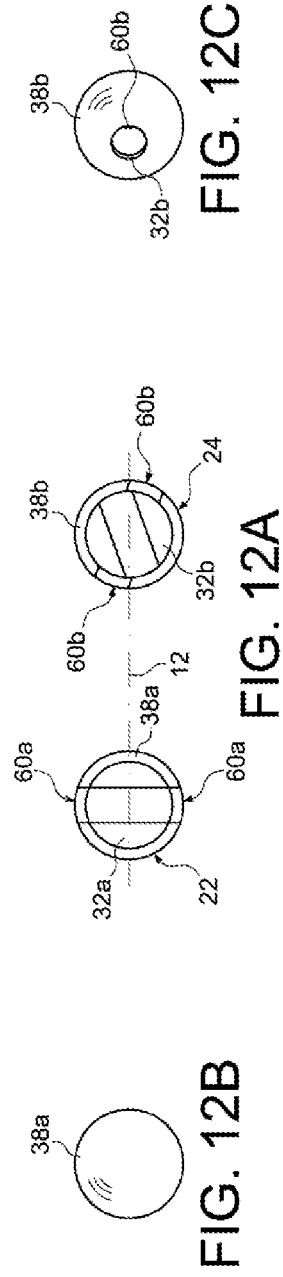
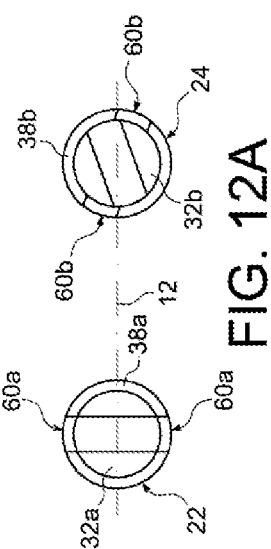
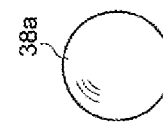

US 11,066,991 B2

CONSTANT-VOLUME COMBUSTION (CVC) CHAMBER FOR AN AIRCRAFT TURBINE ENGINE INCLUDING AN INTAKE/EXHAUST VALVE HAVING A SPHERICAL PLUG

CROSS-REFERENCE TO RELATED APPLICATIONS

This application is a division of U.S. application Ser. No. 14/417,642 filed Jan. 27, 2015, the entire contents of which is incorporated herein by reference. U.S. application Ser. No. 14/417,642 is a 371 of International Application No. PCT/FR13/051832 filed Jul. 30, 2013, and claims the benefit of priority from prior French Application No. 12 57599 filed Aug. 3, 2012.

FIELD OF THE INVENTION

The invention relates to the field of constant-volume combustion chambers for aircraft turbine engines.

The invention applies to any type of turbine engine, particularly turbojets, turboprops, and open rotor turbine engines.

STATE OF THE RELATED ART

Conventionally, the combustion chamber of an aircraft turbine engine operates according to the Brayton cycle, said to have constant-pressure combustion. Nevertheless, for a specific gain in consumption, it has been envisaged to replace the Brayton cycle combustion chamber by a Humphrey cycle combustion chamber, said to have constant-volume combustion or "CVC".

The document FR 2 945 316 describes an example of an embodiment of such a CVC combustion chamber. The chamber comprises at the inlet a compressed gas intake valve capable of switching between an open position and a closed position, and comprises at the outlet a combusted gas exhaust valve also capable of switching between an open position and a closed position. The valve positions are controlled in a synchronised manner in order to implement the three successive phases of the Humphrey cycle, i.e. intake-combustion-exhaust.

Nevertheless, in the solutions according to the prior art, the design of the intake and exhaust valves has proved to be perfectible, particularly in terms of robustness and tightness, the latter potentially being problematic particularly during the high pressurisation observed during the combustion phase.

DESCRIPTION OF THE INVENTION

The aim of the invention is thus that of remedying at least partially the drawbacks mentioned above, in relation to the embodiments of the prior art.

For this purpose, the invention relates to a constant-volume combustion chamber for an aircraft turbine engine, said chamber comprising a compressed gas intake valve capable of adopting an open position and a closed position wherein it blocks the intake of compressed gas into the chamber, said chamber further comprising a combusted gas exhaust valve capable of adopting a closed position wherein it blocks the exhaust of combusted gas outside the chamber.

According to the invention, at least one of the intake and exhaust valves comprises at least one spherical plug.

The invention is characterised in that it envisages a spherical plug valve technology breaking with conventional solutions applied to turbine engine combustion chambers, and providing high-performance robustness and tightness characteristics. This advantageously results in gains in terms of service life and overall performances, since a specific gain in consumption in the region of 10 to 15% in relation to solutions according to the prior art has been observed.

Furthermore, the invention operates advantageously according to a reliable principle based on mere rotation of the spherical plug, preferably always in the same direction, and preferably at a constant speed. This mere rotation makes it possible to alternately allow and block the flow of gas through the valve, in a manner coordinated with the progress of the Humphrey cycle phases such as intake, combustion and exhaust. Very preferably, both the intake and exhaust valves are designed according to the specific principle of the invention.

Preferably, the combustion chamber comprises a cylindrical side wall with a circular cross-section. This side wall shape, which defines the enclosure wherein the combustion takes place, facilitates combustion flow symmetry and heat transfer in the enclosure. Furthermore, the engagement of such a shape with spherical plug valves closing the chamber at both ends thereof, makes it possible to obtain satisfactory tightness levels, for example with basic sealing elements.

Preferably, the spherical plug of the exhaust valve has a gas passage, and said chamber is designed so as to enable, after a gas exhaust phase resulting in the closure of the exhaust valve, recirculation of the combusted gases trapped in said gas passage. Exhaust Gas Recirculation (EGR) is performed either inside the chamber during the subsequent combustion phase, or in an adjacent chamber optionally having a phase shift in the implementation of the combustion cycle.

According to one preferred embodiment of the invention, said valve comprising said at least one spherical plug comprises:

an inner spherical body traversed by a gas passage; and
an outer spherical body housing said inner spherical body and provided with two mutually distant orifices,
said inner and outer spherical bodies, of which at least one acts as said at least one spherical plug, being rotatably mounted in relation to each other, and said two orifices of the outer spherical body being arranged so as to form in conjunction with said gas passage, respectively at each of the two ends thereof, a diaphragm.

In this way, this preferred embodiment enables the opening and closure of the valve merely by the relative rotation of two perforated spherical bodies, interlocked with each other. As a general rule, the valve is opened when the bores are at least partially facing each other in pairs, and closure is obtained by means of an angular offset of said bores formed by said orifices and the gas passage.

Preferably, the inner and outer spherical bodies are mounted contra-rotating. In this case, they each act as a spherical plug according to the invention. Alternatively, only one of the two could be a plug, the inner or outer, the other remaining stationary in relation to the side wall of the chamber. The contra-rotating nature of the two bodies is particularly advantageous in that it makes it possible to retain the centre of each of the two diaphragms in a fixed zone in relation to the side wall of the chamber, for the entire diaphragm opening time. The gas flow can thus retain the same direction, deemed to be the most effective, throughout the valve opening phase, i.e. from the smallest opening cross-section thereof, via the maximum opening thereof to the closure thereof. In this regard, it is preferentially ensured that each diaphragm is kept centred in relation to the combustion enclosure, for the entire valve opening position. This leads to very good combustion performances and a superior ability to retrieve the combustion process in a turbine.

Preferably, each of said two outer spherical body orifices and the two ends of the gas passage of said inner spherical body has, when viewed from the front, an oval overall shape wherein the length extends perpendicularly to an axis of rotation of the inner spherical body in relation to the outer spherical body, and the centres of these orifices/ends of the gas passage are arranged in the same plane orthogonal to said axis of rotation, preferably the diametrical plane. This makes it possible to reduce the almond or slit shape effects of the diaphragm at the start and end of opening, i.e. at the times when the cross-sections are smallest. By retaining a somewhat circular appearance at these times, the gas flow passing through the diaphragm is kept under good conditions. Preferably, the orifices/ends have the same or similar shapes. Nevertheless, the shapes of the bores may be different, for example circular, square, etc., without leaving the scope of the invention.

While this embodiment has two interlocked spherical bodies, it can nonetheless be envisaged to provide a number of upper bodies, all involved in diaphragm formation, the latter being preferentially diametrically opposite.

Preferably, at least one sealing element is provided between the spherical plug and a fixed body of the valve. It may consist of seals, and/or rings made of abradable material, and/or similar sealing elements.

Preferentially, a plurality of sealing segments are provided between the two elements, these segments being preferably oriented in parallel planes to the axis of rotation of the spherical plug, and orthogonally to the main flow direction in the combustion chamber.

Equivalent sealing elements may be provided between the two inner and outer spherical bodies, or, according to the acceptable leak pressures and flow rates, the latter may be directly in contact, without inserting seals therebetween.

According to a further envisaged embodiment, the valve merely comprises a single spherical plug, defining a diaphragm or two opposite diaphragms with a fixed valve body.

The invention also relates to a combustion chamber module comprising at least one chamber as described above, comprising means for driving said at least one spherical plug in rotation, said drive means being preferentially designed to drive each spherical plug at a constant rotational speed. Even if the speed is variable, the direction of rotation remains preferentially unchanged, facilitating the use of the drive.

Preferably, the module comprises a plurality of combustion chambers as described above, the chambers being distributed about a driving axis of the turbine engine, preferably according to an optionally rotating cylinder type arrangement.

Preferably, for at least one combustion chamber and more preferentially for each of the chambers, said drive means are designed to control said intake and exhaust valves in a synchronised fashion, with a phase shift. For this reason, the opening of these two valves is not performed simultaneously, and similarly the closure of said valves is likewise not performed simultaneously. Nevertheless, even though at specific times, both valves may be in the open/closed position, the degree of opening/closure of these valves is then different.

Finally, the invention relates to an aircraft turbine engine comprising such a combustion module.

Further advantages and features of the invention will emerge in the non-limiting detailed description hereinafter.

BRIEF DESCRIPTION OF THE FIGURES

This description will be made with reference to the appended figures wherein;

FIGS. 9A to 13A schematically represent the status of the intake and exhaust valves during a combustion cycle;

FIGS. 9B to 13B represent a front view of the intake valve, in the statuses thereof shown in FIGS. 9A to 13A respectively;

FIGS. 9C to 13C represent a front view of the exhaust valve, in the statuses thereof shown in FIGS. 9A to 13A respectively;

DETAILED DESCRIPTION OF PREFERRED EMBODIMENTS

Figure 1:
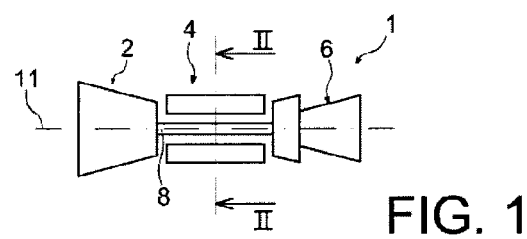
FIG. 1 represents a schematic side view of a turbojet gas generator according to the invention.

With reference to FIG. 1, an aircraft turbine engine 1, preferably that of a turbojet, can be seen.

The generator conventionally comprises, from upstream to downstream, one or a plurality of compressor modules 2, a combustion module 4, and one or a plurality of turbine modules 6. Conventionally, the compressors and turbines are connected by a shaft system 8, driving a receiver of the turbine engine, for example a blower (not shown) in the case of a turbojet.

Figure 2:
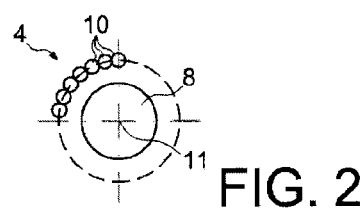
FIG. 2 represents a schematic sectional view along the line II-II in FIG. 1.

The combustion module 4 shown in FIG. 2 shows that it integrates a plurality of combustion chambers 10, distributed about the shaft system 8 on the driving axis 11. The chambers 10, for example provided in a number between 14 and 40, are all preferentially identical. The number of these chambers is preferentially even, so as to be able to neutralise two diametrically opposite chamber cylinders in the event of an anomaly on one thereof, and thus prevent flow dissymmetry at the turbine inlet.

The chambers are arranged in a so-called cylinder configuration, being preferably intended to remain stationary in relation to the motor casing during turbine engine operation.

Each chamber 10 is of the CVC type, i.e. closed at the ends thereof by two intake and exhaust valves synchronised so as to implement the three successive phases of the Humphrey cycle, i.e. intake-combustion-exhaust. Even though they are identical, these chambers 10 are preferably voluntarily phase-shifted in relation to each other in respect of the implementation of the Humphrey cycle. By way of example, a given chamber which is in the intake phase may be adjacent to another chamber in the combustion phase, and soon.

Figure 3:
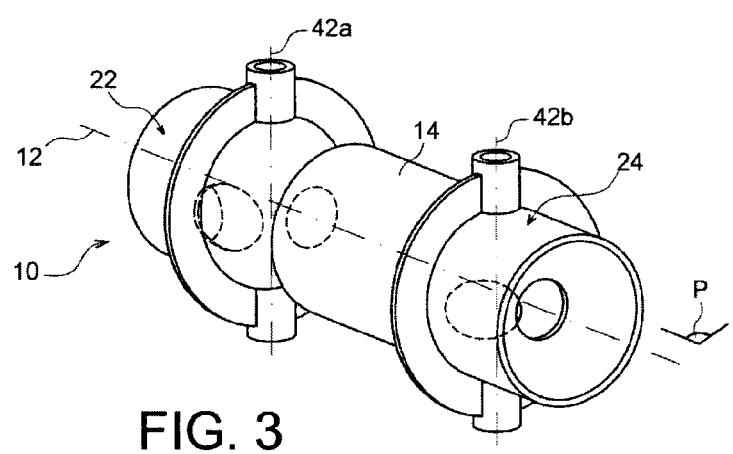
FIG. 3 is a perspective view of one of the combustion chambers fitted in the combustion chamber shown in the previous figure, the chamber being in the form of a first preferred embodiment of the invention.
Figure 4:
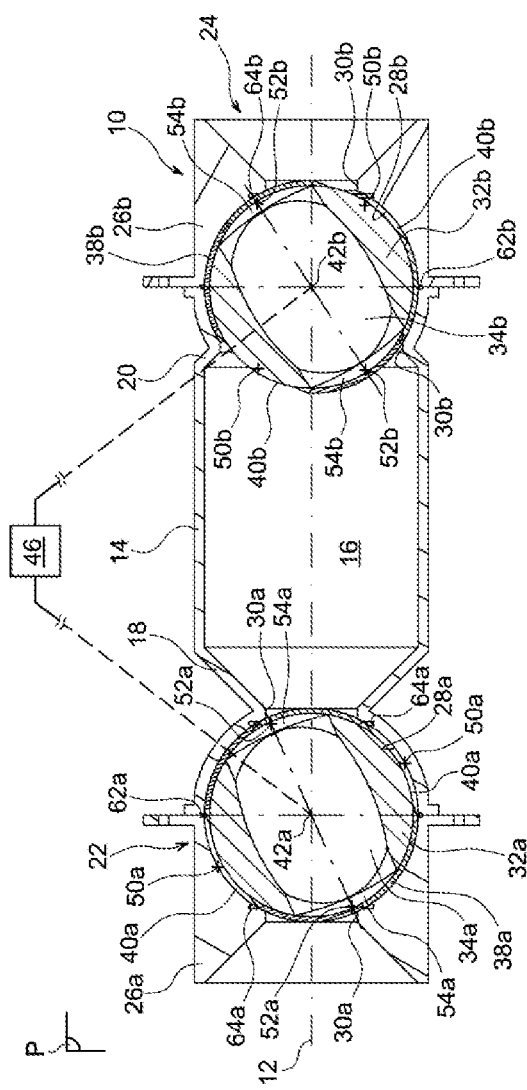
FIG. 4 is a longitudinal sectional view along the plane P in FIG. 3.

FIGS. 3 and 4 represent one of the combustion chambers 10. It is generally oriented parallel to the driving axis, extending about a central chamber axis 12. The chamber 10 comprises a cylindrical side wall 14 with a circular cross-section, centred on the axis 12. This side wall radially defines the limits of the combustion enclosure 16. At the front end thereof, the wall 14 fixedly bears a tapered inlet wall 18 centred on the axis 12; similarly, at the rear end thereof, it fixedly bears an outlet wall 20 which is also tapered, centred on the axis 12. The walls 14, 18 and 20 may be made of a single revolving part.

At the narrow end of the upstream closing tapered wall 18 of the chamber, the latter comprises a compressed gas intake valve 22; similarly, at the narrow end of the downstream closing tapered wall 20 of the chamber, the latter comprises a combusted gas exhaust valve 24. The two valves 22, 24 are specific to the present invention, and preferentially of identical or similar designs.

The intake valve 22 comprises a fixed body 26a acting as a seat, this hollow body 26a having an inner surface 28a in the shape of a truncated sphere having a centre situated on the axis 12. The diameter of this surface is slightly greater than the internal diameter of the side wall 14. At the ends of this inner surface 28a, two diametrically opposite seat orifices 30a are respectively defined. That oriented on the side of the enclosure 16 is defined in conjunction with the narrow end of the inlet wall 18. That situated on the opposite side, on the side of the compressor module, is flared in the upstream direction so as to facilitate the introduction in the intake valve 22 of the compressed gas from the compressor module. The two seat orifices 30a are preferably circular in shape, centred on the axis 12.

The inner surface 28b acts as a bearing surface for two spherical plugs of the intake valve, as described in detail hereinafter. Nevertheless, it is noted that the spherical bearing surface could be replaced by a cylindrical or conical bearing surface, without leaving the scope of the invention.

One of the specificities of the present invention lies in the use of at least one spherical plug providing a satisfactory robustness and degree of tightness, particularly to withstand the high pressurisation observed during the constant-volume combustion phase in the enclosure 16. More specifically, two spherical plugs are thus used herein in this first preferred embodiment.

It consists firstly of an inner spherical body 32a in the shape of a solid ball, traversed by a gas passage 34a extending along an axis passing through the centre of this ball, corresponding to the centre of the inner bearing surface 28a of the body acting as a seat. The ball 32a is preferably made of a single piece. Optionally, it is perforated with cooling channels for the circulation of an air flow intended for the impact cooling of the outer sphere 38a described hereinafter, and/or for the film cooling of the outer surface of this ball 32a.

The passage 34a of the ball 32a preferentially has a constant cross-section.

The valve 22 further comprises an outer spherical body 38a in the shape of a hollow sphere, wherein the inner surface has a slightly greater diameter than the diameter of the outer surface of the ball 32a, in order to be able to house and hold in a sliding fit enabling the free rotation of one sphere in relation to the other. Furthermore, the outer surface of the sphere 38a has a diameter substantially less than the diameter of the inner bearing surface 28a of the body 26a, so as to be housed and held thereby, also enabling the free rotation of the sphere in the bearing surface.

The inner spherical body 38a is provided with mutually distant orifices 40a, which are also diametrically opposite. The two orifices 40a, each passing through the thickness of the sphere, have centres arranged on a diameter of the sphere.

The inner and outer spherical bodies 32a, 38a, which are interlocked, are rotatably mounted in relation to each other along an axis of rotation 42a, perpendicular to the driving axis 12. More specifically, each one is rotatably mounted on the body 26a acting as a seat, using pivots or equivalent elements. As detailed hereinafter, the inner and outer spherical bodies 32a, 38a are intended to be contra-rotating, i.e. rotated about the axis 42a along opposite directions, and preferably at constant speeds. In this respect, it is noted that the combustion module 4 comprises means for driving these spherical plugs in rotation, these means 46 represented schematically in FIG. 4 conventionally comprising one or a plurality of motors controlled by a control unit, preferably FADEC. These means 46 are further shared with the exhaust valve 24.

The same FIG. 4 represents the centre 50a of the orifices 40a, and the centre 52a of each of the two open ends 54a of the gas passage 34a. The four centres 50a, 50a, 52a, 52a are arranged in the same cutting plane P in FIG. 4, this diametrical plane being orthogonal to the axis of rotation 42a. This arrangement of the centres on the plane P is retained during the rotation of the spherical plugs 32a, 38a.

Figure 5:
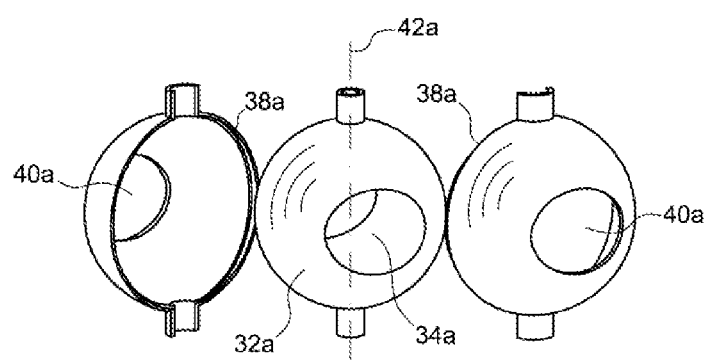
FIG. 5 and FIG. 6 represent, in an exploded perspective and front view respectively, the spherical plugs of the intake valve fitted in the combustion chamber shown in FIGS. 3 and 4.

With reference to FIGS. 5 to 8B, the two spherical plugs 32a, 38a are represented. As shown in FIG. 5, the sphere 38a may be obtained using two half-spheres fixedly mounted on each other, for example by welding. Each of the half-spheres has one of the two orifices 40a. The latter seen in FIGS. 7A and 7B is such that when viewed from the front as in FIG. 7A, it has an overall oval shape wherein the length 56a extends perpendicularly to the axis of rotation 42a, this length 56a being situated in the plane P.

Figure 8A:
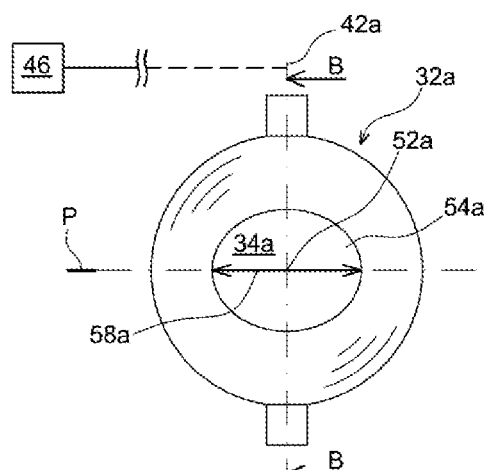
FIG. 8A is a front view of the inner spherical plug of the valve shown in FIGS. 5 and 6.
Figure 8B:
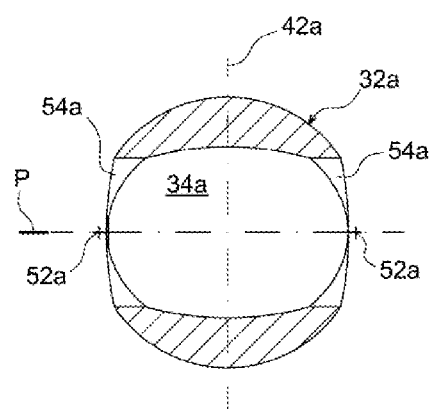
FIG. 8B is a sectional view along the line B-B in FIG. 8A.

Similarly, each end 54a of the gas passage 34a, seen in FIGS. 8A and 8B, is such that when viewed from the front in FIG. 8A, it has an overall oval shape wherein the length 58a extends perpendicularly to the axis of rotation 42a, this length 58a also being situated in the plane P. More specifically, the ends 54a and the orifices 40a have a substantially identical shape, such that when these bores are aligned along the axis 12 of the chamber, they are situated in pairs in perfect continuity in respect to each other. In this alignment position, in the front view, the lengths 56a, 58a are thus substantially identical. These lengths are less than or equal to the diameter of the orifice 30a of the fixed body 26a.

Figure 6:
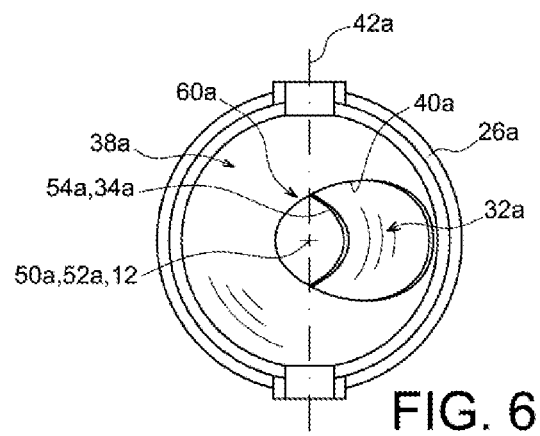
Figure 7A:
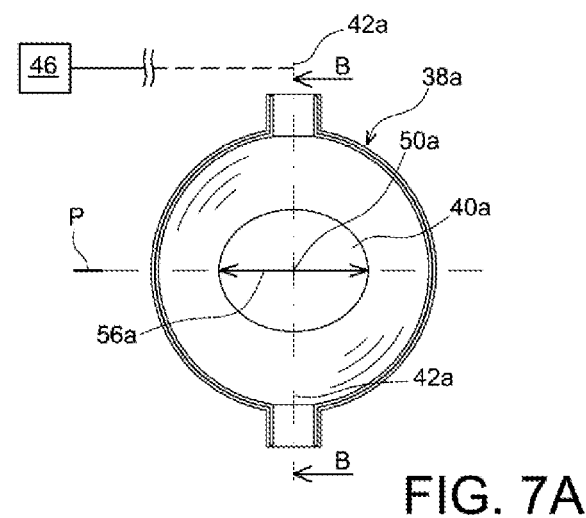
FIG. 7A is a front view of the outer spherical plug of the valve shown in FIGS. 5 and 6.
Figure 7B:
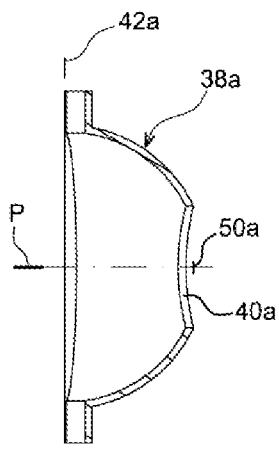
FIG. 7B is a sectional view along the line B-B in FIG. 7A.

In FIG. 6, it is shown that each orifice 40a forms, with one of the ends 54a of the gas passage 34a, a diaphragm 60a specific to the present invention.

Each diaphragm 60a thus has an opening cross-section dependent on the superposed area between the orifice 40a and the end 54a forming this diaphragm, this area varying according to the relative angular position between the two plugs 32a, 38a. The full opening of the diaphragm 60a corresponds to the shape of the bores 40a, 54a, the cross-section decreasing as the centres 50a, 52a move circumferentially away from each other, during the contra-rotating movement of the plugs 32a, 38a. Similarly, before obtaining the full opening, the cross-section increases until the centres 50a, 52a are aligned on the axis 12.

Due to the oval shape of the bores, the diaphragm 60a retains at the start and end of opening an overall shape approaching that of a disk, suitable for circulating the gas flow under satisfactory conditions.

Due to the particular arrangement of the bores 40a, 54a, the two diaphragms 60a are continuously diametrically opposed, which, at all times, the same opening cross-section. In this respect, it is noted that during the rotation of the two plugs, the two diaphragms 60a open either with the centres thereof aligned on the axis 12, or with the centres thereof aligned on a perpendicular axis to said axis 12. In the first case, this makes it possible to set the valve 22 in an open position for introducing compressed gas into the enclosure 16. This configuration is obtained twice during a full rotation of each plug 32a, 38a. As mentioned above, when fully opened, the two diaphragms 60a aligned with the orifices 30a of the fixed valve body have a cross-section less than that of these orifices 30a, implying that the latter are not involved in the gas passage cross-section.

In the second case, the compressed gas from the compressor module cannot transit via the diaphragms 60a and pass through the gas passage 34a, and thus cannot reach the enclosure 16 since the diaphragms 60a do not open onto the orifices 30a giving access to the chamber of the chamber. Despite the opening of the diaphragms, the valve 22 is thus in the closed position. Furthermore, a system of seals is provided between the inner surface 28a of the fixed body and the outer surface of the outer spherical body 38a, such that the compressed gases previously trapped in the gas passage 34a do not enter the chamber enclosure in this closed position of the valve. Back to FIG. 4, an example of a system of seals is represented, embodied using three circular sealing segments borne by the fixed body 26a, and all arranged in planes parallel to the axis of rotation 42a. It consists of a central segment 62a, situated in a diametrical plane or in the vicinity, and of two lateral segments 64a of lesser diameters, situated in the vicinity of the two orifices 30a of the body acting as the seat 26a. Equivalent seals may be placed between the spherical bodies 32a, 38a, although the latter are preferably in direct spherical contact, with no seal.

Consequently, when the diaphragms 60a are aligned perpendicular to the axis 12 of the chamber, the compressed gases previously trapped in the gas passage 34a cannot be discharged towards the enclosure 16, due to the presence of the downstream lateral seal 64a preventing gas leaks in the downstream direction.

Again with reference to FIG. 4, it is noted that the combusted gas exhaust valve 24 has an identical or similar design to the intake valve 22 described above. Thus, the elements of the valve 24 that are identical or similar to the elements of the valve 22 bear the same reference numbers, with only the extension "a" being replaced by the extension "b".

Consequently, here also, due to the particular arrangement of the bores 40b, 54b, the two diaphragms are continuously diametrically opposed, with, at all times, the same opening cross-section. Also, during the rotation of the two plugs, the two diaphragms open either with the centres thereof aligned on the axis 12, or with the centres thereof aligned on an axis perpendicular to said axis 12. In the first case, this makes it possible to set the valve 24 to an open position enabling the exhaust of the combusted gases outside the enclosure 16. This configuration is obtained twice during a full rotation of each plug 32b, 38b. As mentioned above, at full opening, the two diaphragms aligned with the orifices 30b of the fixed valve body have a cross-section less than that of these orifices 30b, implying that the latter are not involved in the gas passage cross-section.

Figure 4A:
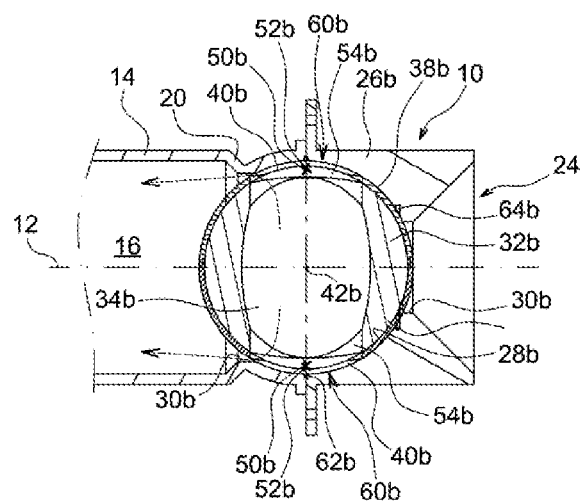
FIG. 4a is a partial view equivalent to that in FIG. 4, with the chamber exhaust valve occupying a different position.

In the second case represented in FIG. 4a, where the diaphragms 60b are aligned along an axis perpendicular to the axis 12, the combusted gases trapped in the gas passage 34b after an exhaust step may be released by transiting via the diaphragms 60b and the upstream orifice 30b, to subsequently reach the enclosure 16 as represented schematically by the arrows. This is particularly enabled by the absence of an upstream lateral seal segment, and by an upstream orifice 30b having a greater diameter than that of the downstream orifice 30b of the fixed body, representing two differences with the intake valve 22. In this way, the upstream orifice 30b has a greater diameter than the downstream orifice 30a of the inlet wall 18, this being obtained by providing inlet 18 and outlet 20 walls of different shapes, the latter not approaching the axis 12 as much as the first. This release of gas makes it possible to obtain a combusted gas recirculation function, also referred to as EGR, for igniting the mixture in the enclosure 16, during the combustion step following that of the exhaust mentioned above. This EGR ignition is preferably performed in conjunction with conventional ignition, known from the prior art.

With reference now to FIGS. 9A to 14, the different phases of the constant-volume combustion cycle in the chamber 10 will now be described. During this cycle, as mentioned above, the drive means apply identical speeds in opposite directions to the spherical plugs of the valves. Furthermore, there is a phase shift between the synchronised intake and exhaust valves, opening and closure of these valves not being performed simultaneously, as seen clearly in FIGS. 9A to 13C.

Figure 14:
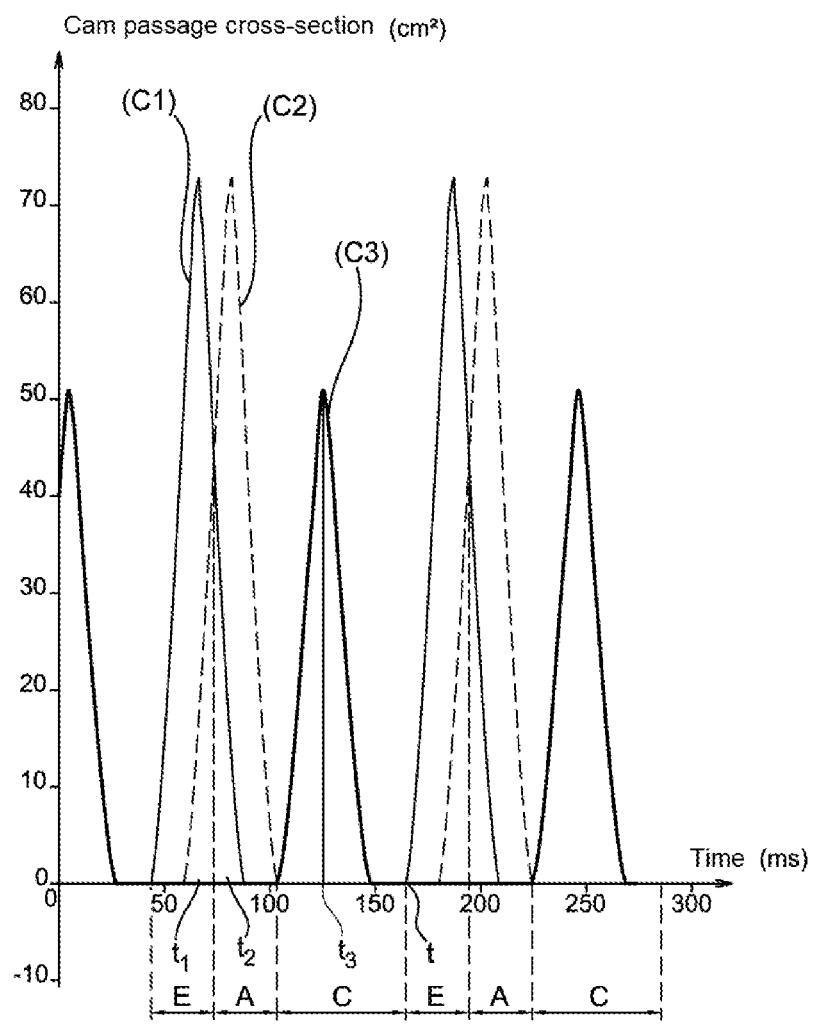
FIG. 14 represents a graph showing the opening cross-section of the intake and exhaust valves during the combustion cycle.

In the graph in FIG. 14, the curve (C1) represents the opening cross-section of the exhaust valve 24, thus corresponding to the opening cross-section of the diaphragms 60b when they are aligned along the chamber axis 12. The curve (C2) represents the opening cross-section of the intake valve, corresponding to the opening cross-section of the diaphragms 60a when they are aligned along the chamber axis 12. Finally, the curve (C3) represents the EGR opening cross-section of the exhaust valve 24, corresponding to the opening cross-section of the diaphragms 60b when they are aligned along an axis perpendicular to the chamber axis 12. The phases "E", "A", "C" correspond to the exhaust, intake, combustion phases, respectively.

In FIGS. 9A to 9C, the valves 22 and 24 are in a configuration for implementing the exhaust phase. The opening cross-section of the diaphragms 60b is maximal, and this status thus corresponds to that of the time t1 on the graph in FIG. 14. At this time, the valve 22 is just starting to open, to initiate the intake phase of a new cycle. The passage cross-section of the diaphragms 60a is thus very small.

In the middle of the intake phase as represented in FIGS. 10A to 10C, the opening cross-section of the diaphragms 60a is maximal, and this status thus corresponds to that of the time t2 on the graph in FIG. 14. At this time, the valve 24 is almost entirely closed, to initiate the combustion phase. The passage cross-section of the diaphragms 60b is thus very small.

FIGS. 11A to 11C represent the combustion phase during which the two valves 22, 24 are closed. On the other hand, the exhaust valve 24 is in the EGR configuration, i.e. in the status shown in FIG. 4a. The combusted gases previously trapped in the passage 34b are thus recirculated in the combustion enclosure. In this case, the EGR opening cross-section is maximal, corresponding to the time t3 on the graph in FIG. 14.

FIGS. 12A to 12C represent the valves immediately prior to initiating the exhaust phase, at the time t4 on the graph in FIG. 14. The diaphragms 60b of the exhaust valve are ready to open, whereas the intake valve 22 remains in the closed position.

Figure 13C:
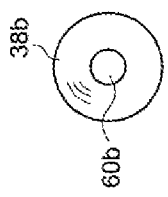
Figure 13A:
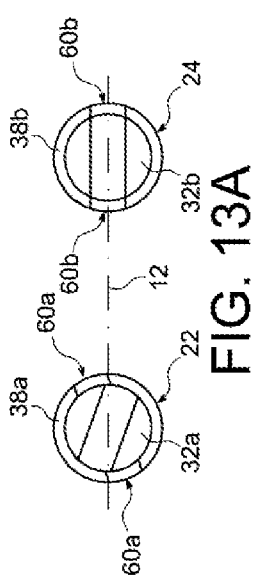
Figure 13B:
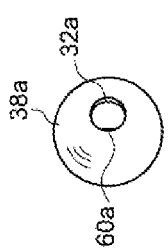

FIGS. 13A to 13C represent the return of the values to the positions thereof shown in FIGS. 9A to 9C, during the exhaust phase. Consequently, a complete combustion cycle is performed during a half-rotation of each spherical plug, or, in other words, a complete rotation of each spherical plug is equivalent to two entire combustion cycles.

Figure 15:
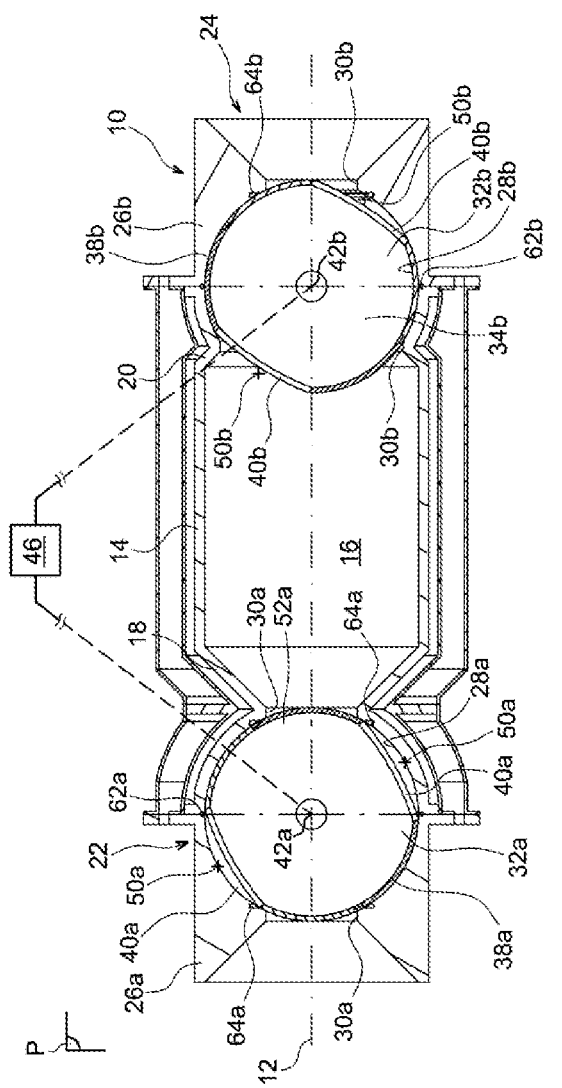
FIG. 15 is a similar view to that in FIG. 4, with the combustion chamber being in the form of a second preferred embodiment of the invention.

FIG. 15 represents a second preferred embodiment of the combustion chamber 10, this second embodiment differing from the first in that each valve 22, 24 does not have two spherical plugs, but only one. The shape thereof may be identical or similar to that of the outer plug 38a or that of the inner plug 32a described above. Regardless of the shape chosen from this single plug, the diaphragms are then formed using bores in the plugs, and using the orifices 30a, 30b of the fixed bodies 26a, 26b acting as a seat. The other elements of the chamber, along with the method for implementing the combustion cycle, remain unchanged.

Figure 16:
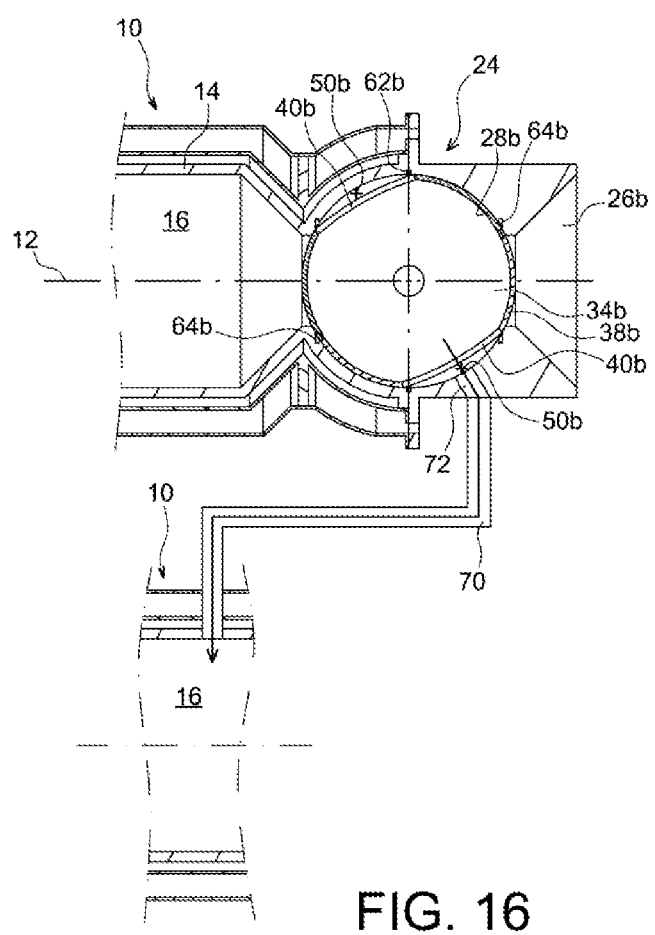
FIG. 16 represents a portion of a combustion chamber similar to that of the second embodiment, this chamber being in the form of an alternative embodiment.

Finally, FIG. 16 shows an alternative embodiment wherein the exhaust valve 24 has a three-segment seal system, identical or similar to those of the intake valve of the first preferred embodiment. In this case, when the single spherical plug 38b has the orifices 40b thereof oriented between the central seal 62b and the downstream lateral seal 64b, it is possible to reinject the combusted gases previously trapped in the hollow of the sphere comparable to the gas passage 34b mentioned above, towards another adjacent combustion chamber via one or a plurality of suitable conduits 70. These conduits 70 are connected to passages 72 passing through the body 26b, in order to open at the spherical inner surface 28b between the two seal segments 64b, 62b.

This makes it possible to provide the EGR function in the adjacent combustion chamber 10, which preferably have a phase-shift in the implementation of the combustion cycle, in this case a slight delay. All the combustion chambers of the cylinder module 4 can be connected to each other in an identical or similar manner to that represented in FIG. 16.

Obviously, various modifications may be made by those skilled in the art to the invention described above, merely as non-limiting examples.

The invention claimed is:

1. A constant-volume combustion chamber for an aircraft turbine engine, the combustion chamber comprising:
    a compressed gas intake valve configured to adopt an open position and a closed position, in the closed position blocking intake of compressed gas into the combustion chamber; and
    a combusted gas exhaust valve configured to adopt an open position and a closed position, in the closed position blocking exhaust of combusted gas outside the combustion chamber;
    wherein at least one of the compressed gas intake valve and the combusted gas exhaust valve comprises a spherical plug including an inner spherical body including two mutually distant orifices traversed by a gas passage,
    wherein the combusted gas exhaust valve includes a fixed body forming a seat for the inner spherical body of the spherical plug, in the open position the two mutually distant orifices of the inner spherical body align with a respective two mutually distant orifices of the fixed body to allow exhaust of combusted gas outside the combustion chamber, the fixed body further including a body passage passing through the fixed body,
    wherein the combustion chamber further comprises a conduit connected to the body passage and to a sidewall of another combustion chamber, and
    wherein the inner spherical body of the spherical plug of the combusted gas exhaust valve is rotated to the closed position in which the gas passage communicates with the body passage to enable the combusted gases trapped in the gas passage to be injected through the body passage towards the another combustion chamber via the conduit.

* * * * *